United States Patent
Fard et al.

(10) Patent No.: US 11,962,713 B2
(45) Date of Patent: Apr. 16, 2024

(54) APPARATUS AND METHOD FOR BATTERY STATUS MONITORING IN A NETWORK-ENABLED SMOKING SUBSTITUTE DEVICE

(71) Applicant: Imperial Tobacco Limited

(72) Inventors: Daniel Fard, Liverpool (GB); Oliver Talbot, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 889 days.

(21) Appl. No.: 17/001,798

(22) Filed: Aug. 25, 2020

(65) Prior Publication Data

US 2021/0037893 A1 Feb. 11, 2021

Related U.S. Application Data

(63) Continuation of application No. PCT/EP2019/053497, filed on Feb. 13, 2019.

(30) Foreign Application Priority Data

Feb. 26, 2018 (GB) ...................... 1803030

(51) Int. Cl.
*A24F 40/65* (2020.01)
*A24F 40/53* (2020.01)
(Continued)

(52) U.S. Cl.
CPC ......... *H04M 1/72412* (2021.01); *A24F 40/53* (2020.01); *A24F 40/65* (2020.01); *A24F 40/90* (2020.01); *A24F 40/10* (2020.01)

(58) Field of Classification Search
None
See application file for complete search history.

(56) References Cited

U.S. PATENT DOCUMENTS

2015/0101625 A1* 4/2015 Newton ................. A24F 40/60
131/329
2015/0245668 A1* 9/2015 Memari ................. A24F 40/60
206/250

(Continued)

FOREIGN PATENT DOCUMENTS

GB 2542012 A 3/2017
KR 20160108855 A 9/2016
(Continued)

OTHER PUBLICATIONS

International Search Report, dated Apr. 26, 2019, in PCT/EP2019/053497, filed Feb. 13, 2019.

(Continued)

*Primary Examiner* — Dennis R Cordray
(74) *Attorney, Agent, or Firm* — DUNLAP CODDING, P.C.

(57) ABSTRACT

The disclosure relates to a technique that enables a status of a battery in a smoking substitute device to be monitored through a portable communication terminal (e.g. mobile phone). The smoking substitute device is configured to communicate wirelessly with the portable communication terminal, e.g. via a wireless personal area network, to transmit status information concerning the battery. The status information is processed either locally or in the cloud to provide feedback or other notifications to a user of the device. Usage data may also be transmitted, whereby the battery status can be expressed in terms of a predicted remaining usage, e.g. predicted number of remaining activation events.

20 Claims, 6 Drawing Sheets

(51) Int. Cl.
    *A24F 40/90*     (2020.01)
    *H04M 1/72412*     (2021.01)
    *A24F 40/10*     (2020.01)

(56) References Cited

U.S. PATENT DOCUMENTS

| | | |
|---|---|---|
| 2017/0013883 A1 | 1/2017 | Han et al. |
| 2018/0043114 A1 | 2/2018 | Bowen et al. |
| 2018/0093054 A1* | 4/2018 | Bowen .................. A61M 11/042 |
| 2018/0271155 A1* | 9/2018 | Baker .................... A24F 40/60 |

FOREIGN PATENT DOCUMENTS

| | | |
|---|---|---|
| WO | 2014195805 A2 | 12/2014 |
| WO | 2017055793 A1 | 4/2017 |
| WO | WO 2017/055793 A1 | 4/2017 |
| WO | WO 2017/056103 A1 | 4/2017 |
| WO | WO 2017/205692 A1 | 11/2017 |

OTHER PUBLICATIONS

Written Opinion of the International Searching Authority, dated Apr. 26, 2019, in PCT/EP2019/053497, filed Feb. 13, 2019.
UKIPO Search Report (GB1803030.4), dated Jun. 27, 2018, 9 pages.

* cited by examiner

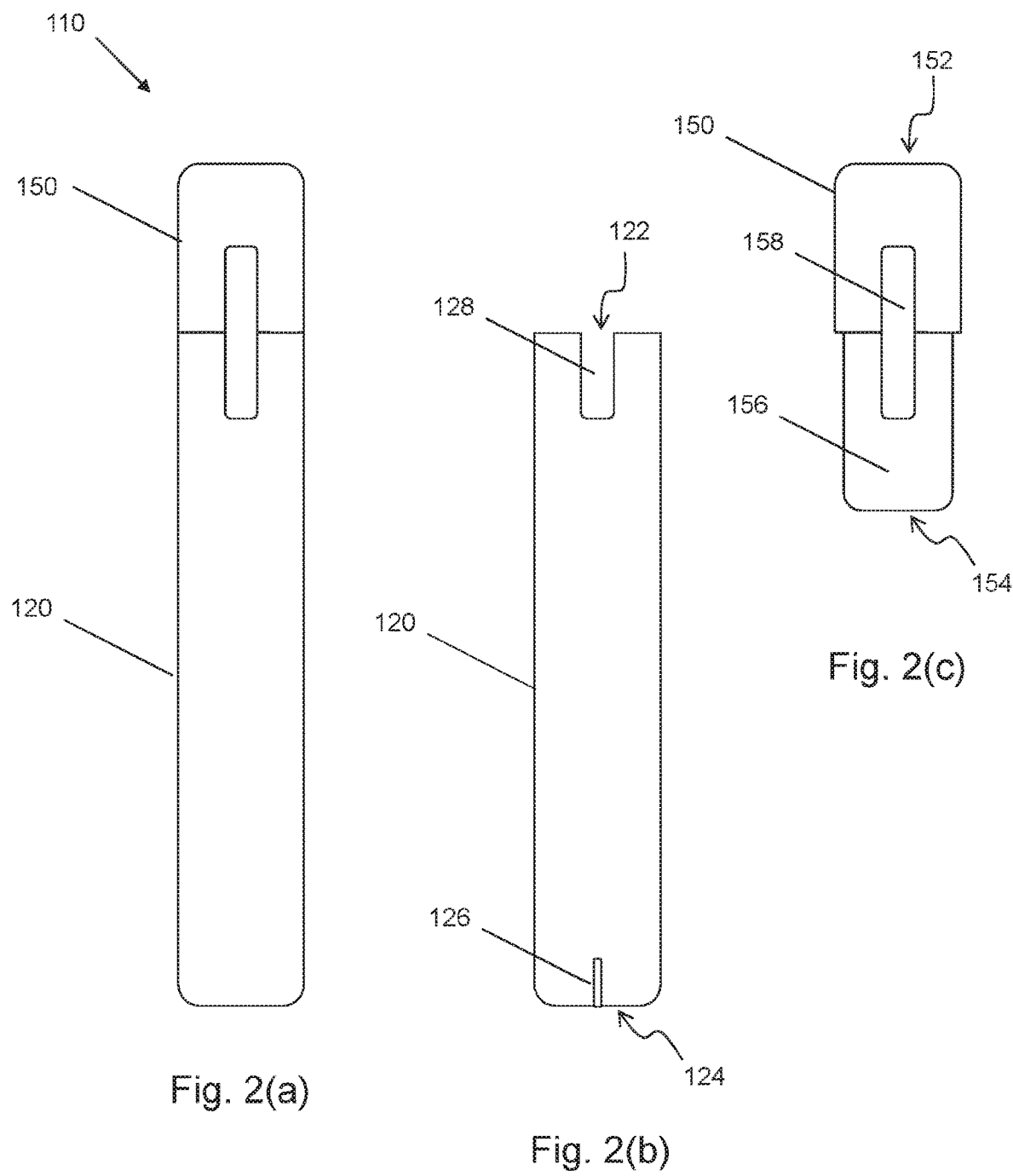

APPARATUS AND METHOD FOR BATTERY STATUS MONITORING IN A NETWORK-ENABLED SMOKING SUBSTITUTE DEVICE

CROSS-REFERENCE TO RELATED APPLICATIONS/INCORPORATION BY REFERENCE STATEMENT

The present patent application is a continuation of International Application No. PCT/EP2019/053497, filed Feb. 13, 2019; which claims priority to the patent application identified by GB Serial No. 1803030.4, filed on Feb. 26, 2018. The entire contents of each of the above-referenced patent(s)/patent application(s) are hereby expressly incorporated by reference herein.

TECHNICAL FIELD

The present disclosure relates to smoking substitute devices. In particular, it relates to a network-enabled smoking substitute device, i.e. a smoking substitute device capable of wireless communication with other devices, e.g. over a short range network.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol, also referred to as a "vapour," that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid," is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute device is the so-called "heat not burn" ("HNB") approach in which tobacco (rather than e-liquid) is heated or warmed to release vapour. The tobacco may be leaf tobacco or reconstituted tobacco. The vapour may contain nicotine and/or flavourings. In the HNB approach the intention is that the tobacco is heated but not burned, i.e. does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapour. A vapour may be formed from a carrier in the tobacco material (this carrier may for example include propylene glycol and/or vegetable glycerin) and additionally volatile compounds released from the tobacco. The released vapour may be entrained in the airflow drawn through the tobacco.

As the vapour passes through the smoking substitute device (entrained in the airflow) from an inlet to a mouthpiece (outlet), the vapour cools and condenses to form an aerosol (also referred to as a vapour) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

An example of the HNB approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HNB approach is the device known as "Glo"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g. a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present disclosure has been devised in light of the above considerations.

BRIEF DESCRIPTION OF THE DRAWINGS

Embodiments and experiments illustrating the principles of the present disclosure will now be discussed with reference to the accompanying figures in which:

FIG. 2(a) shows an example smoking substitute device for use as the smoking substitute device in the system of FIG. 1.

FIG. 2(b) shows the main body of the smoking substitute device of FIG. 2(a) without the consumable.

FIG. 2(c) shows the consumable of the smoking substitute device of FIG. 2(a) without the main body.

DETAILED DESCRIPTION

Figure 1:
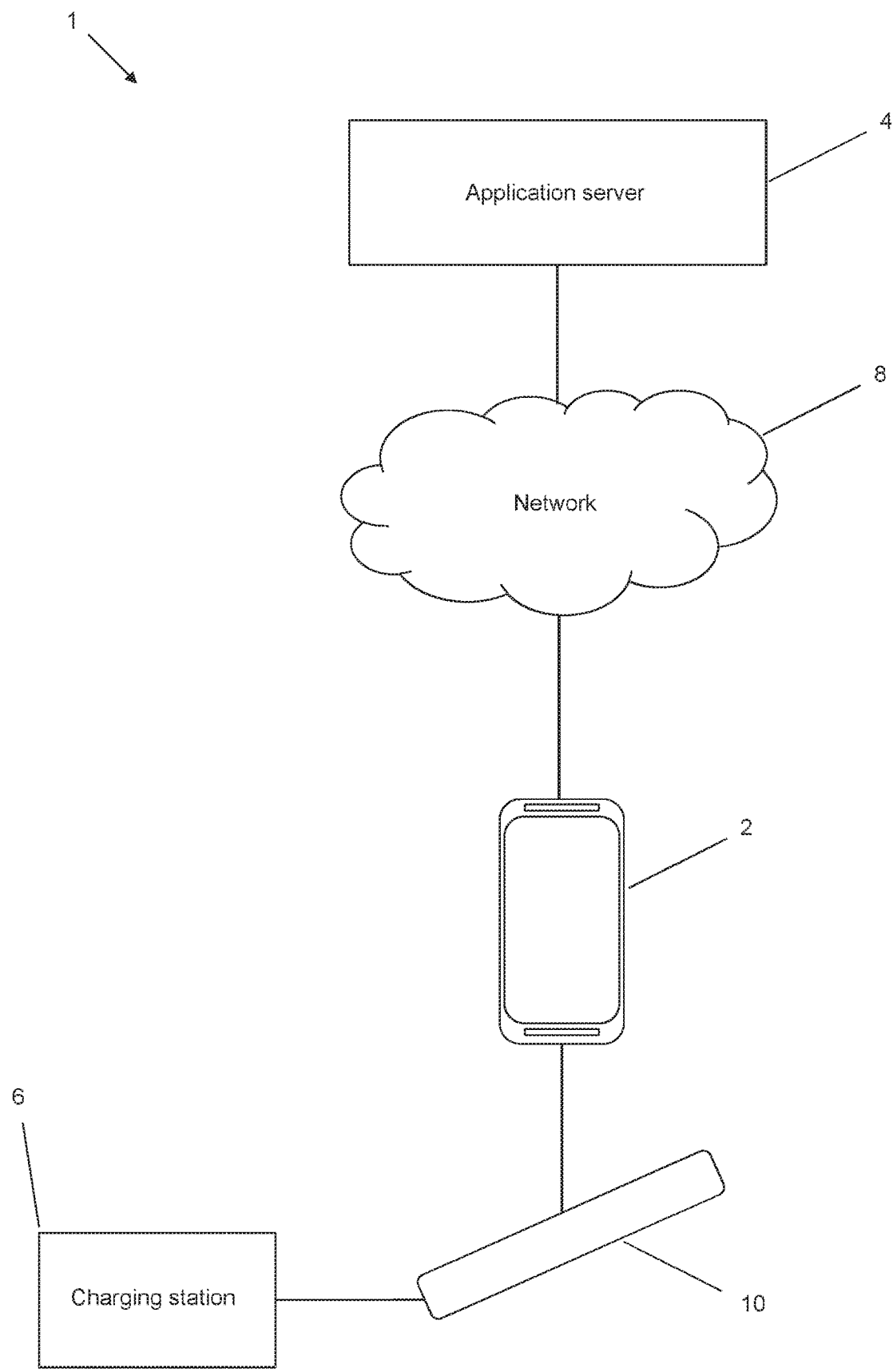
FIG. 1 shows an example system for managing a smoking substitute device.

At its most general, the present disclosure enables the status of a battery in a smoking substitute device to be monitored through a portable communication terminal (e.g. mobile phone). The smoking substitute device is network-enabled in the sense that it can communicate wirelessly with the portable communication terminal, e.g. to transmit status information concerning the battery. The portable communication terminal may process status information received from the smoking substitute device either locally or in the cloud to provide feedback or other notifications to a user of the device.

According to a first non-limiting aspect of the present disclosure, there may be provided a computer-implemented method for monitoring battery status in a smoking substitute device, the method comprising: transmitting, via a wireless communication channel between the smoking substitute device and a portable communication terminal, a battery data log from the smoking substitute device to the portable communication terminal; calculating, by the portable communication terminal, battery-related information based on the received battery data log; issuing, by the portable communication terminal, a battery event notification if the battery-related information satisfies a predetermined criterion. With this technique, a user can be presented with more information rich content relating to the power source of the smoking substitute device without having to provide additional processing power or display capability on the smoking substitute device itself.

The smoked substitute device may resemble any of the smoking substitute devices discussed above further comprising a wireless interface for establishing and communicating over the wireless communication channel between the smoking substitute device and a portable communication terminal. The wireless interface may utilities any suitable wireless protocol. For example, the wireless interface may operate over a short range network. For example, it may comprise a wireless personal area network (WPAN), e.g. using Bluetooth™, ZigBee, a WiFi personal hotspot or the like. The smoking substitute device may pair with the portable communication terminal over the wireless communication channel. The portable communication terminal may be a master device and the smoking substitute device may be a slave device.

The portable communication terminal may be any communications device capable of wireless interaction with the smoked substitute device, e.g. of over a short range network. The portable communication terminal may be a mobile phone (e.g. smartphone), tablet computer, laptop computer, or the like.

The smoking substitute device may be configured to record, detect or otherwise observe battery status information on a regular (e.g. periodic) or ad hoc basis, e.g. under the control of a control unit running on the smoking substitute device. The method may comprise, before the wireless communication channel is established between the smoking substitute device and the portable communication terminal: recording, by the smoking substitute device, a plurality of battery status measurements; and generating, by the smoking substitute device, the battery data log from the plurality of battery status measurements. The battery status measurements may be of any parameter that is indicative of a charge-related property of the battery. The battery data log may be a data structure that associates a charge-related property of the battery recorded by the smoking substitute device with a time stamp indicative of when the charge-related property was recorded. The charge-related property may be a voltage measured across the battery.

The received battery data log may be processed by the portable communication terminal locally, e.g. using a processor and memory in the portable communication terminal itself. Alternatively, the received battery data log may be processed by a remote application server (e.g. in the cloud), which is in networked communication with the portable communication terminal. The network communication between the portable communication terminal and the application server may be separate or independent of the wireless communication channel between the smoking substitute device and the portable communication terminal. The network communication may comprise a connection over the world wide web. The network communication may utilise a cellular network or a WiFi network, for example.

Communication between the portable communication terminal and the application server may be controlled by a app running on the portable communication terminal. The app may run in the background on the portable communication terminal to receive the battery data log and handle subsequent processing. The portable communication terminal may be arranged to re-transmit the battery data log to the application server for the battery-related information to be calculated. The battery-related information may be returned to the portable communication terminal for subsequent action to be determined. Alternatively the subsequent action (e.g. decision about whether or not to issue a notification) may be taken in the application server.

The battery-related information may comprise data indicative of a property of the battery. In one example, the property of the battery is remaining charge. The portable communication terminal may be arranged to display the battery-related information to the user, e.g. on request via interaction with the app.

In this example, the predetermined criterion may comprise a threshold charge, whereby a battery event notification is issued if the remaining charge falls below the threshold charge. The threshold charge may be adjustable, e.g. by the user interacting with the portable communication terminal. The user may thus be able to control the circumstances in which a notification is issued, e.g. to suit particular needs.

The battery-related information may be more sophisticated, e.g. by taking into account usage habits and device configuration. The method may comprise transmitting, via the wireless communication channel between the smoking substitute device and a portable communication terminal, usage data indicative of one or more activation events at the smoking substitute device that draw power from the battery. The activation events may correspond to the user inhaling from the smoking substitute device in a manner that causes vapour to be drawn from the consumable.

The usage data may include information indicative of the number and duration of activation events in the current charge cycle or since the last time the smoking substitute device connected to the portable communication terminal. Herein the current charge cycle may mean the period of time since the battery was previously recharged. The usage data on the smoking substitute device may be reset following transfer thereof to the portable communication terminal. This ensures that redundant data is not unnecessarily transmitted, which can save battery life.

The method may include deriving, by the portable communication terminal from the battery data log and usage data, predicted available usage information for the smoking substitute device, wherein the battery-related information comprises the predicted available usage information. In this way, the battery data log can be transformed into data that is a realistic representation of the remaining usage available on the current battery charge, which can assist the user in planning usage.

The predicted available usage information may comprise a predicted number of remaining activation events available in the current battery charge cycle.

In this example, the predetermined criterion may comprise an activation activity threshold, whereby a battery event notification is issued if the predicted available usage information falls below the activation activity threshold. For example, the activation activity threshold may comprise a minimum remaining activation events limit, whereby a battery event notification is issued if the predicted available usage information indicates that a predicted number of remaining activation events falls below the minimum remaining activation events limit. The activation activity threshold may be adjustable, e.g. by the user interacting with the portable communication terminal. The user may thus be able to control the circumstances in which a notification is issued, e.g. to suit particular needs.

The method may comprise transmitting, via the wireless communication channel between the smoking substitute device and the portable communication terminal, device information relating to a configuration of the smoking substitute device. The configuration may relate to an identity and/or setup of components within the smoking substitute device. Such a configuration may have an impact on the power drawn from the battery during each activation event, and therefore may be used to determine the predicted available usage information discussed above. Alternatively or additionally, the method may include determining, by the portable communication terminal based on the device information received from the smoking substitute device, a battery profile indicative of expected battery behaviour, wherein the battery-related information is calculated with reference to the battery profile. The battery profile may be based on a battery type (e.g. brand or product number) and a known or estimate age of the battery, e.g. calculated based on completed charge cycles. The battery profile may be indicative of a remaining charge evolution for a battery of a certain type and certain age. The battery profile may thus be used to determine the predicted available usage information discussed above.

The method may include comparing, by the portable communication terminal, the battery-related information to threshold data to determine whether or not the battery-related information satisfies the predetermined criterion.

The battery event notification may be any suitable message or prompt. Issuing the notification may comprises generating a visible, audible or tactile output on the portable communication device. The nature of the notification may be selectable by the user, e.g. via the app running on the portable communication terminal.

In another non-limiting aspect, the present disclosure may provide a smoking substitute device comprising: a battery; a control unit; a memory storing computer readable instructions for execution by the control unit; a heater arranged to draw power from the battery during an activation event; and a wireless interface configured to: establish a wireless communication channel with a portable communication terminal, and transmit a battery data log over the wireless communication channel. The smoking substitute device may have any of the features of a conventional smoking substitute device discussed above.

The control unit may be further configured to obtain and transmit, using the wireless interface, usage data indicative of one or more activation events that draw power from the battery. This functionality can enable the status information about the battery to be tailored to the usage history of the device.

In another non-limiting aspect, the present disclosure may provide an apparatus for monitoring battery status in a smoking substitute device, the apparatus comprising a portable communication terminal configured to communicate with the smoking substitute device via a wireless communication channel, wherein the portable communication terminal is configured to: receive, via the wireless communication channel, a battery data log from the smoking substitute device; calculate battery-related information based on the received battery data log; compare the battery-related information to threshold data; and issue a battery event notification if the battery-related information fulfils a predetermined criterion relative to the threshold data. The apparatus may also include the smoking substitute device discussed above.

In yet another non-limiting aspect, the present disclosure may comprise a computer program product comprising a computer-readable storage medium having computer-readable instructions stored thereon, wherein the computer-readable instructions are executable as an app in a portable communication terminal to perform the method of monitoring battery status in a smoking substitute device disclosed above.

The present disclosure includes the combination of the aspects and particular features described except where such a combination is clearly impermissible or expressly avoided.

Aspects and embodiments of the present disclosure will now be discussed with reference to the accompanying figures. Further aspects and embodiments will be apparent to those skilled in the art. All documents mentioned in this text are incorporated herein by reference.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g. via Bluetooth™, with an application (or "app") installed on the mobile device 2, e.g. via a suitable wireless interface (not shown) on the mobile device 2. The mobile device 2 may be any portable communication terminal capable of running an app, such as a mobile phone or smartphone, a tablet computer, or a laptop computer, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, such as (but not limited to) a wireless communication channel such as via a cellular network (e.g. according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 2(a) shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod."

In this example, the smoking substitute device 110 is a closed system vaping device, wherein the consumable 150 includes a sealed tank 156 and is intended for one-use only.

FIG. 2(a) shows the smoking substitute device 110 with the main body 120 physically coupled to the consumable 150.

FIG. 2(b) shows the main body 120 of the smoking substitute device 110 without the consumable 150.

FIG. 2(c) shows the consumable 150 of the smoking substitute device 110 without the main body 120.

The main body 120 and the consumable 150 are configured to be physically coupled together, in this example by pushing the consumable 150 into an aperture in a top end 122 of the main body 120. In other examples, the main body 120 and the consumable could be physically coupled together by screwing one onto the other, or through a bayonet fitting, for example. An optional light 126, e.g. an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

In certain non-limiting embodiments, the tank 156 includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

The tank 156 may be referred to as a "clearomizer" if it includes a window 158, or a "cartomizer" if it does not.

Figure 3A:
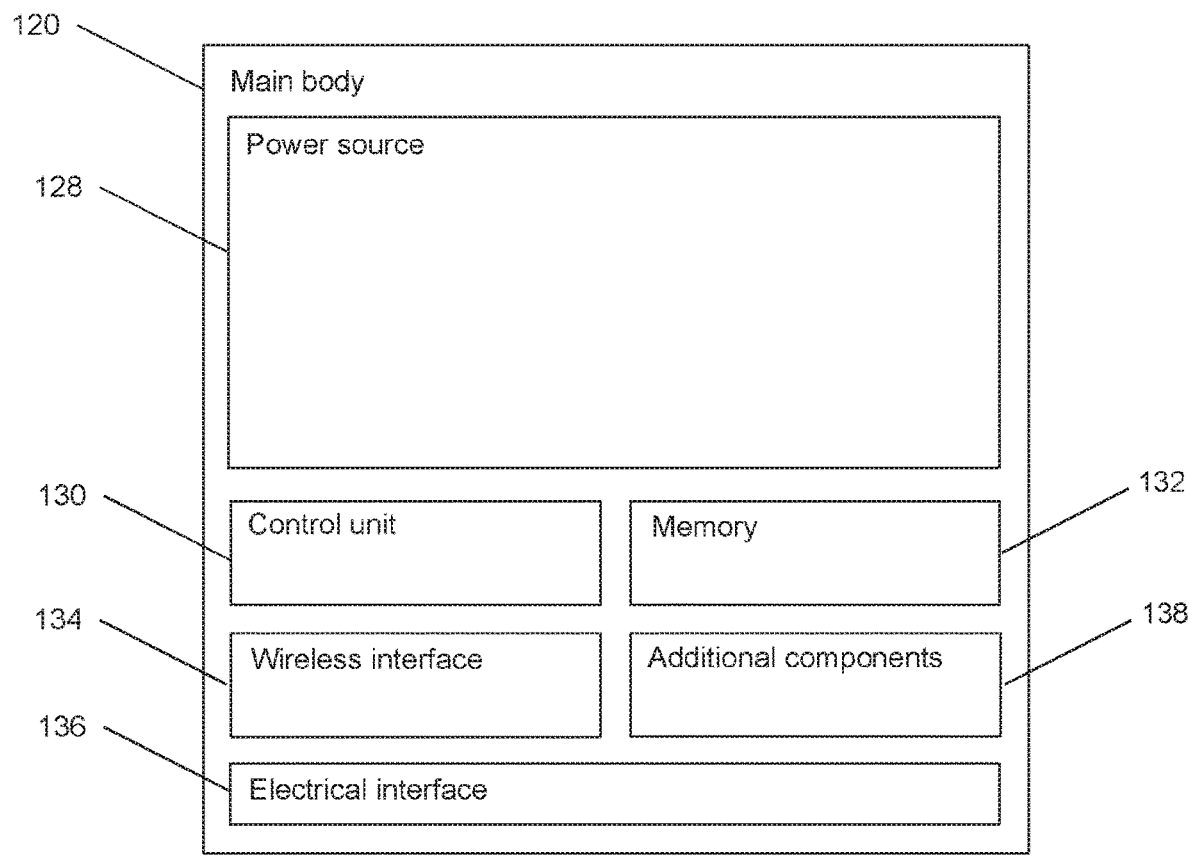
FIG. 3(a) is a schematic view of the main body of the smoking substitute device of FIG. 2(a).

FIG. 3(a) is a schematic view of the main body 120 of the smoking substitute device 110.

Figure 3B:
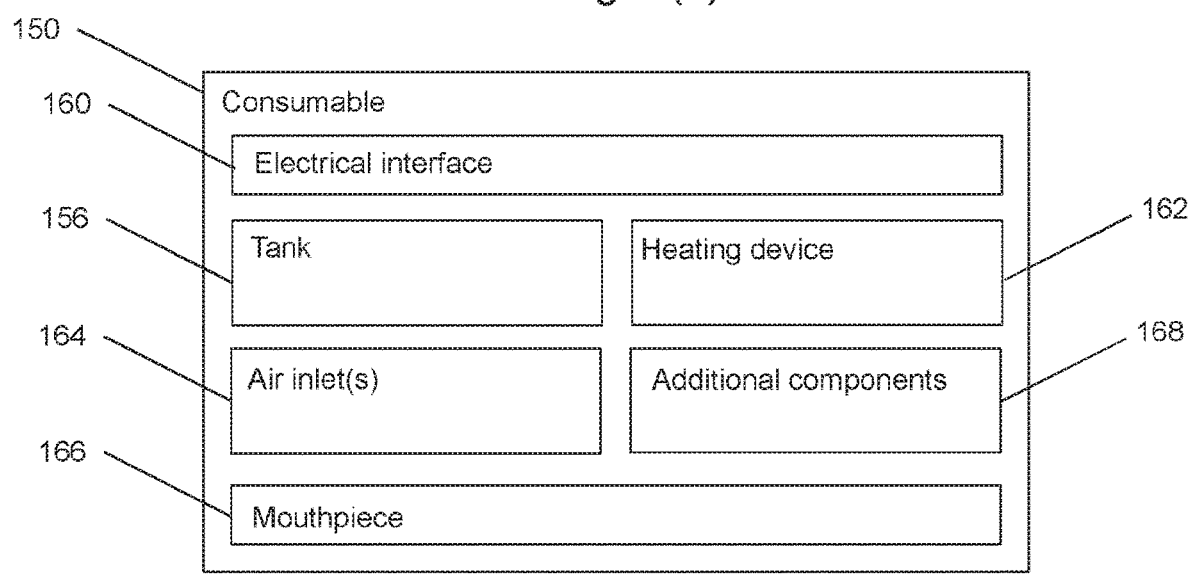
FIG. 3(b) is a schematic view of the consumable of the smoking substitute device of FIG. 2(a).

FIG. 3(b) is a schematic view of the consumable 150 of the smoking substitute device 110.

As shown in FIG. 3(a), the main body 120 includes a power source 128, a control unit 130, a memory 132, a wireless interface 134, an electrical interface 136, and, optionally, one or more additional components 138.

In certain non-limiting embodiments, the power source 128 is a battery, such as (but not limited to) a rechargeable battery.

The control unit 130 may include a microprocessor, for example.

The memory 132 may include non-volatile memory for storing computer readable instructions which, when executed, control operation of the device. In this example, the memory may include storage for a battery data log and other device data discussed in more detail below.

In certain non-limiting embodiments, the wireless interface 134 is configured to communicate wirelessly with the mobile device 2 via a short range wireless network, e.g. a wireless personal area network (WPAN). The wireless interface 134 may be incorporate any suitable short-distance wireless technology, e.g. Bluetooth™, ZigBee, Wireless USB, or the like. To this end, the wireless interface 134 could include a Bluetooth™ antenna. Other wireless communication interfaces, e.g. WiFi, are also possible.

The electrical interface 136 of the main body 120 may include one or more electrical contacts. The electrical interface 136 may be located in, and in certain particular (but non-limiting) embodiments at the bottom of, the aperture in the top end 122 of the main body 120. When the main body 120 is physically coupled to the consumable 150, the electrical interface 136 may be configured to pass electrical power from the power source 128 to (e.g. a heating device of) the consumable 150 when the smoking substitute device 110 is activated, e.g. via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could instead be located in the charging station 6 (if present).

The additional components 138 of the main body 120 may include an airflow sensor for detecting airflow in the smoking substitute device 110, e.g. caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less desired where the consumable 150 is intended to be disposed of after use, as in this example).

The additional components 138 of the main body 120 may include an actuator, e.g. a button. The smoking substitute device 110 may be configured to be activated when the actuator is actuated. This provides an alternative to the airflow sensor noted, as a mechanism for activating the smoking substitute device 110.

As shown in FIG. 3(b), the consumable 150 includes the tank 156, an electrical interface 160, a heating device 162, one or more air inlets 164, a mouthpiece 166, and, optionally, one or more additional components 168.

The electrical interface 136 of the main body 120 and an electrical interface 160 of the consumable 150 are configured to cooperate in a manner that electrically couples the main body 120 to the consumable 150. The electrical coupling may permit electrical power and, optionally, data to pass between the main body 120 and consumable 150. The electrical interface 160 of the consumable 150 may include one or more electrical contacts configured to physically contact the electrical interface 136 of the main body 120. In this way, electrical energy (e.g. in the form of an electrical current) is able to be supplied from the power source 128 in the main body 120 to the heating device 162 in the consumable 150.

In certain non-limiting embodiments, the heating device 162 is configured to heat e-liquid contained in the tank 156, e.g. using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

In certain non-limiting embodiments, the one or more air inlets 164 are configured to allow air to be drawn into the smoking substitute device 110, when a user inhales through the mouthpiece 166.

In use, a user activates the smoking substitute device 110, e.g. through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 2(a), 2(b), and 2(c) and FIGS. 3(a) and 3(b) shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 1, instead of the smoking substitute device 110. One such open system vaping device is the blu PRO™ e-cigarette discussed above.

As another example, an entirely disposable (one use) smoking substitute device could be used as the smoking substitute device 10 of FIG. 1, instead of the smoking substitute device 110.

Embodiments of the present disclosure relate to the configuration and use of a network-enabled smoking substitute device such as that discussed above for communicating information to a user relating to the status of the power source 128 in the main body 120 of the device. In particular, the main body is configured to transmit wirelessly information relating to the power source to the mobile device 2. An app running on the mobile device may process the received information to calculate current battery status information and to determine whether or not to generate a notification for the user.

As discussed above, the power source is typically a battery. The present disclosure may find particular use with devices having a rechargeable power source (e.g. one or more rechargeable batteries), as the app may utilise information about historical usage of the device to inform its calculation of current battery status. The calculated status therefore be sensitive to the manner in which a particular user uses the device, and hence be more likely to correspond to the user's experience.

Figure 4:
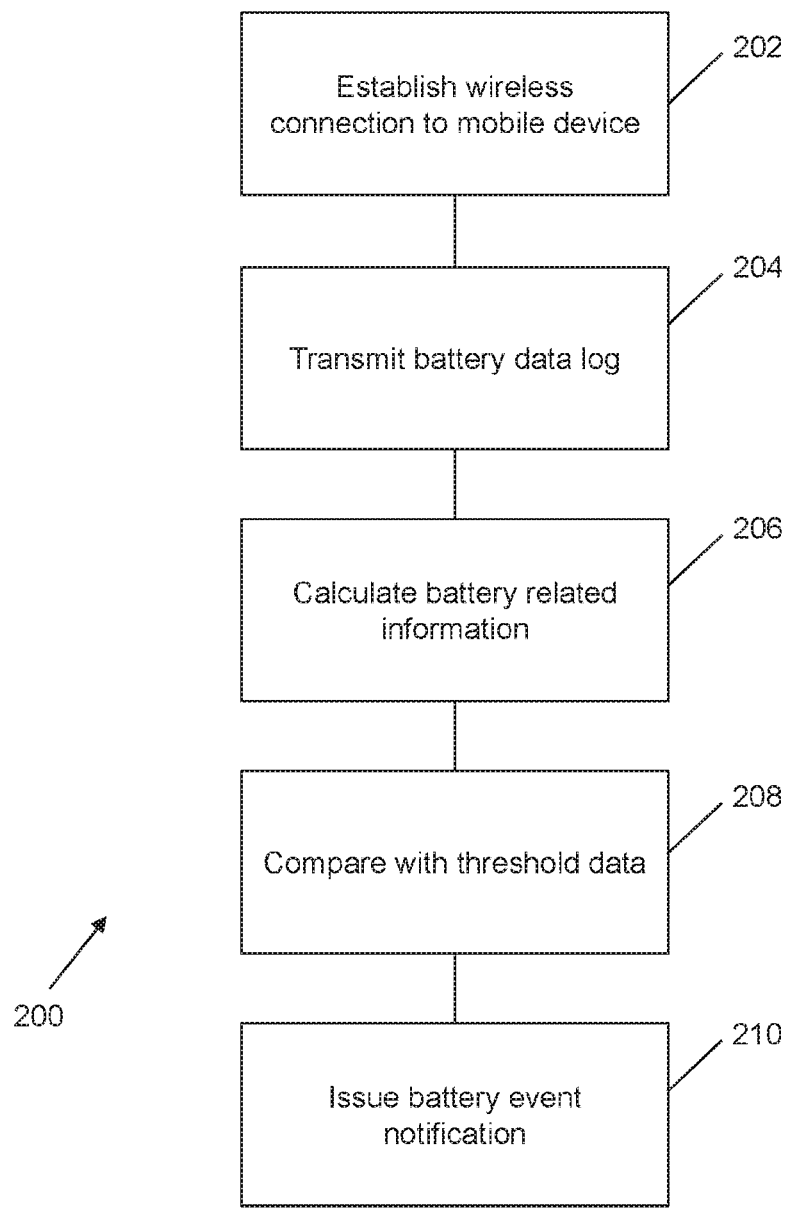
FIG. 4 is a flow chart of a battery status monitoring method that is an embodiment of the present disclosure.

FIG. 4 is a flow chart showing steps in a battery status monitoring method 200 that is an embodiment of the present disclosure. The method 200 begins with a step 202 of establishing a wireless connection between a smoking substitute device (such as the device 110 discussed above) and a mobile device (such as the mobile device 2 discussed above). The wireless connection may be via any suitable wireless protocol that permits transmission of information. For example, the smoking substitute device may pair with the mobile device using a short range transmission protocol such as Bluetooth™ or the like. The smoking substitute device may be wirelessly connectable to the mobile device via any suitable personal area network.

The method continues with a step 204 of transmitting, from the smoking substitute device to the mobile device over the established wireless connection, a battery data log. The battery data log is a data structure that is indicative of battery status measurements recorded by the smoking substitute device. In one example, the control unit 130 of the main body 120 is arranged to execute a routine that measures a charge-related property of the battery and record the result with a time stamp in the memory 132. The battery data log may be a collection of this type of battery status measurements.

The charge-related property of the battery may be any parameter that allows the battery's remaining charge to be calculated. For example, the charge-related property may be the battery's voltage. The routine may be executed periodically, whereby the battery data log is indicative of the change over time of the voltage. In another example, the charge-related property may be indicative of drawn charge from the battery, e.g. measured by the amount of current drawn together with the period for which it was drawn. In this example, the routine may be executed for each activation event of the device, e.g. each time a user inhales to draw vapour.

The battery data log may be renewed or restarted after it has been successfully transmitted to the mobile device. In this way, information from a certain time period need only be transmitted once to the mobile device. Minimising data transfer in this way can reduce the load placed on the battery by the wireless communication module.

The step 204 of transmitting the battery data log may also comprise transmitting other device data to the mobile device to assist in subsequent calculations. The other device data may include usage data that is indicative of how a user has used the device, e.g. in terms of the nature of the activation events that draw power from the battery. The usage data may include information indicative of the number and duration of activation events in the current charge cycle or since the last time the device connected to the mobile device. The other device data may also include device information e.g. relating to the type of battery or the internal configuration of the device which may affect the power drawn by each activation event.

The method continues with a step 206 of calculating, by an app running on the mobile device that is associated with the smoking substitute device, battery-related information based on the received battery data log. Upon establishing connection with the smoking substitute device, the mobile device operate to execute (if not already running) the app. The app may run in the background while receiving and processing data from the smoking substitute device. The app may be arranged to utilise processing capability of the mobile device to perform the calculating step. Alternatively, the received data may be re-transmitted by the mobile device over a network to an application server. The calculations may be performed at the application server and the results returned to the mobile device.

The data received at the mobile device (or application server) may be used an input data to an algorithm for determining the battery-related information. The battery-related information may be directly indicative of a property of the battery, such as remaining charge (e.g. expressed as a percentage of full charge). Alternatively or additionally, the battery-related information may be information concerning predicted available usage that is derived from the input data. The predicted available usage may include number of remaining activation events available in the current battery charge cycle.

In order to calculate the predicted available usage accurately, the algorithm may use the other device data as inputs. For example, where the other device data includes usage data, the algorithm may be able to determine an average charge draw on the battery for each activation event. This may vary from user to user, e.g. due to the duration of the activation event and/or the particular configuration of the heater and associated circuitry. Moreover, the effect of an activation event on the charge level of a battery may also depend on the age of the battery and/or how many charge cycles it has been through. The app may include a battery profile that includes age-related information. Based on received data that identifies the type of battery and its age or number of completed charge cycles, the app may use the battery profile information to determine appropriate performance properties of the battery for use in the calculating step.

The result of the calculating step may be visible by the user, e.g. by opening the app and navigating to a suitable status display screen. The results of the calculation may be stored locally (on the mobile device) for this purpose. However, the method of the present disclosure also enables the mobile device to automatically notify the user when certain events, e.g. certain predetermined battery-related events, occur.

To achieve this, the method continues with a step 208 of comparing calculated data with one or more thresholds. Each threshold may be associated with a battery-related event that warrants a notification to the user. The battery-related events and corresponding threshold may be selectable by the user, e.g. via a suitable user interface provided by the app. In one example, the battery-related event may be a low battery charge. The threshold in this case may be a predetermined battery charge level (e.g. expressed as a percentage), such as 15%, 10%, 5% or the like. The calculated battery change level may be compared with this threshold. If it falls below it, the method may continue to a step 210 of issuing a notification to the user. In another example, the battery-related even may be a minimum number of remaining activation events, e.g. expressed as a number of events or a number of 10s of events. The calculated remaining activation events may be compared with this threshold. If it falls below it, the method may continue to a step 210 of issuing a notification to the user. In this latter example, it can be seen that by taking account of the user's historical behaviour, the method can avoid unnecessary or mistimed notifications.

In step 210, the mobile device may be arranged to generate a suitable notification to the user. The notification may be visible, audible, tactile or a combination thereof. For example, the notification may cause the mobile device to vibrate and simultaneously display a banner with a message that is indicative of the battery-related event. The manner in which the notification is issued may be controlled by the user in a conventional manner.

Although the examples above relate to notifications that prompt a user to recharge the battery, it can be understood that the present disclosure can be used to notify other events. For example, in closed devices intended for one use, a notification may be used to indicate if usage is such that the battery will lose charge before the tank is emptied. A user may thus be prompted to modify the duration of each activation event in order to use the device efficiently and hence avoid waste.

Figure 5:
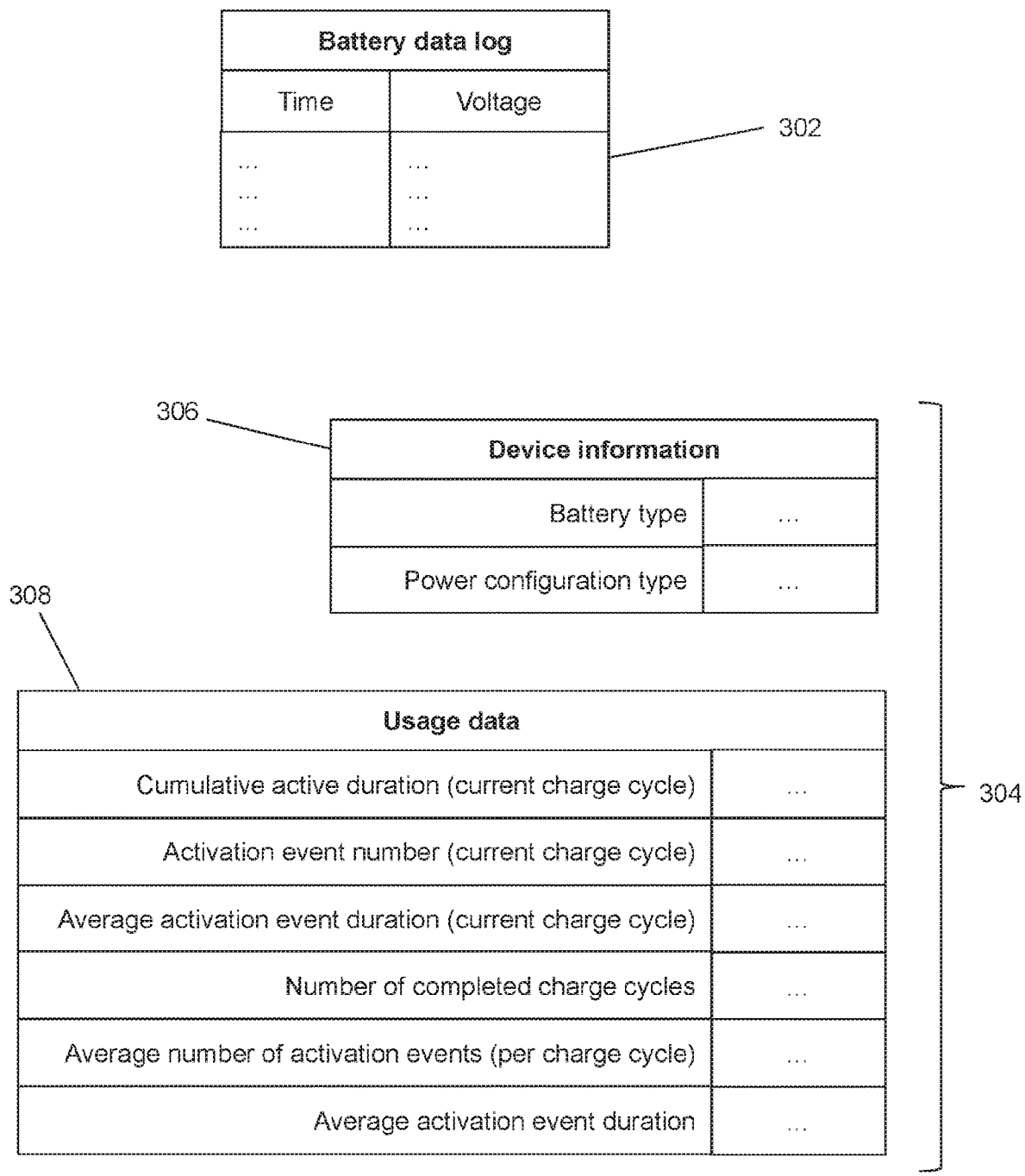
FIG. 5 is a schematic representation of various data structures that can be used in embodiments of the present disclosure.

FIG. 5 shows schematic examples of various data structures that may be used with the method described above. The data structures include a battery data log 302 and other device data 304.

The battery data log 302 comprises a list of measured voltages for the battery obtained at various times, e.g. corresponding to a regular pattern. Each measurement voltage is associated with a time stamp that indicates the time at which it was obtained.

The other device data 304 comprise device information 306 which lists various properties of the device and battery that can be used by the app to influence parameters in the algorithm used to calculate the battery-related information. For example, the device information 306 includes a battery type field and a power configuration type field. The app may use information in the battery type field to identify a battery profile to use for the calculating step. The power configuration type field may be used to establish (e.g. via a look up table or the like) an average power or charge draw on the battery for each activation event. This parameter can be used in conjunction with an average activation event duration to convert a calculated remaining charge for the battery into a predicted number of remaining activation events.

The other device data 304 also comprises usage data 308 that is recorded for the specific device by routines executed by its control unit. In this example the usage data 308 includes a number of completed charge cycles field which can be used in conjunction with information in the battery type field to determine appropriate behaviour for the battery from the battery profile.

The usage data 308 may also include field relevant to the determined of a predicted number of remaining activation events for the remaining battery charge. This may include one or both of an average activation event duration for the current charge cycle and an average activation event duration for the lifetime of the battery. It can be understood that the latter parameter may not be applicable on devices without a rechargeable battery. The usage data may also include other raw data, such as the number of activation events for the current charge cycle and a cumulative active duration, i.e. how long the battery has been in an "on" state in the current charge cycle.

Figure 6:
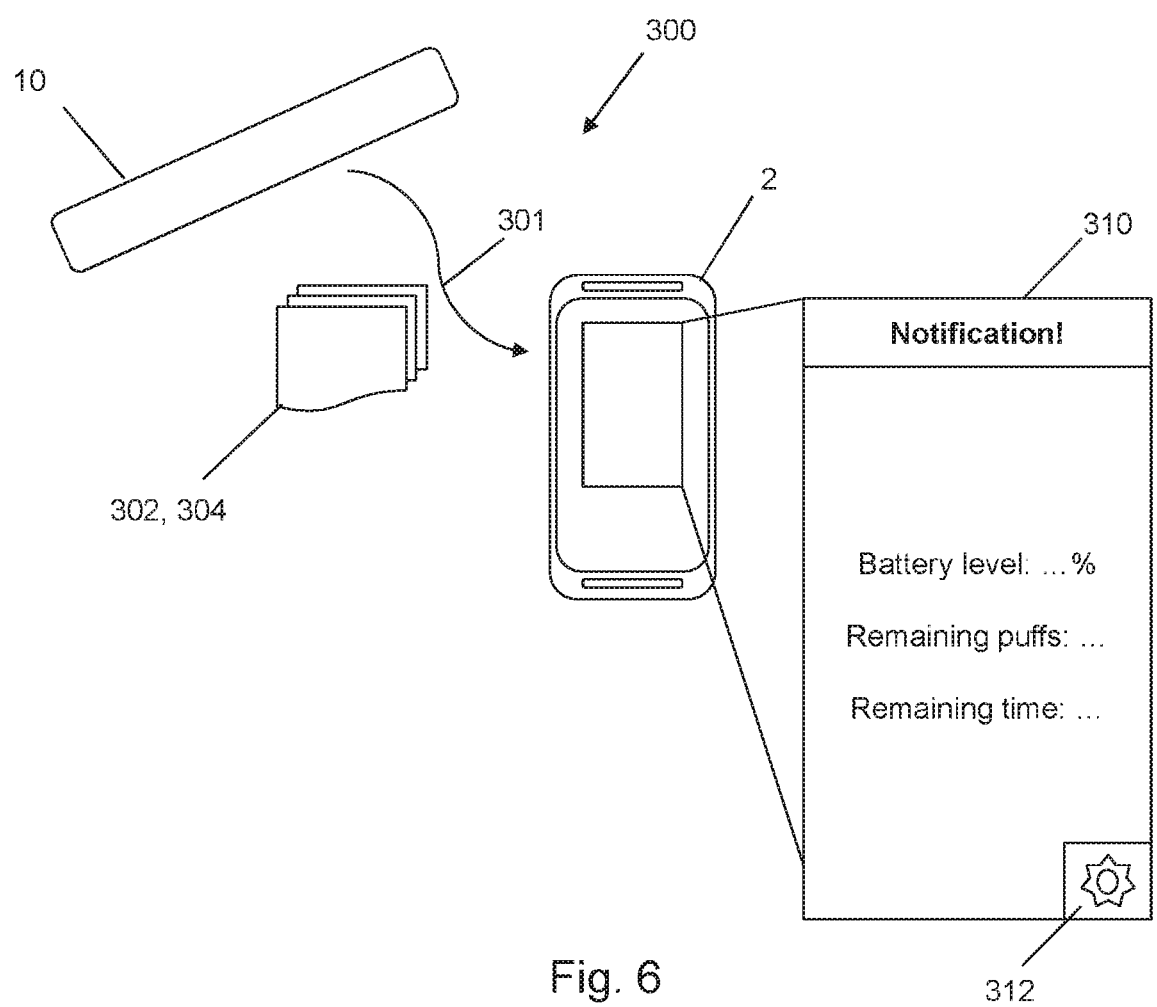
FIG. 6 is a schematic view of a battery status monitoring apparatus that is an embodiment of the present disclosure.

FIG. 6 is a schematic view of a battery status monitoring apparatus 300 that is an embodiment of the present disclosure when in use. The apparatus 300 comprises the mobile device 2 and smoking substitute device 10 discussed above. The smoking substitute device 10 is in wireless communication with the mobile device over a suitable short range network 301, over which it transmits the battery data log 302 and other device data 304.

The mobile device 2 comprises a display screen as is conventional. The app may be configured to display a notification 310 on the display screen. The notification 310 may show information indicative of any one or more of remaining battery charge, remaining activation events (also referred to as "puffs"), and remaining battery lifetime. The display screen may be a touch screen, and the notification may include a selectable icon 312 to allow the user to open the app to access further information.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include," and variations such as "comprises," "comprising," and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A computer-implemented method for monitoring battery status in a smoking substitute device, the method comprising:
    transmitting, via a wireless communication channel between the smoking substitute device and a portable communication terminal, a battery data log from the smoking substitute device to the portable communication terminal;
    calculating, by the portable communication terminal, battery-related information based on the received battery data log;
    issuing, by the portable communication terminal, a battery event notification if the battery-related information satisfies a predetermined criterion; and
    renewing the battery data log after transmission to the portable communication terminal,
    such that the battery data log from a certain time period is only transmitted once to the portable communication terminal.

2. The method of claim 1, further comprising, before the wireless communication channel is established between the smoking substitute device and the portable communication terminal, the steps of:
    recording, by the smoking substitute device, a plurality of battery status measurements; and
    generating, by the smoking substitute device, the battery data log from the plurality of battery status measurements.

3. The method of claim 1, wherein the battery data log is a data structure that associates a charge-related property of the battery recorded by the smoking substitute device with a time stamp indicative of when the charge-related property was recorded.

4. The method of claim 3, wherein the charge-related property is a voltage measured across the battery.

5. The method of claim 1, wherein battery-related information comprises data indicative of a property of the battery.

6. The method of claim 5, wherein the property of the battery is remaining charge.

7. The method of claim 6, wherein the predetermined criterion comprises a threshold charge, whereby a battery event notification is issued if the remaining charge falls below the threshold charge.

8. The method of claim 7, wherein the threshold charge is adjustable.

9. The method of claim 1, further comprising the step of transmitting, via the wireless communication channel between the smoking substitute device and the portable communication terminal, usage data indicative of one or more activation events at the smoking substitute device that draw power from the battery.

10. The method of claim 9, wherein the usage data includes information indicative of the number and duration of activation events in the current charge cycle or since the last time the smoking substitute device connected to the portable communication terminal.

11. The method of claim 9, further comprising the step of deriving, by the portable communication terminal from the battery data log and usage data, predicted available usage information for the smoking substitute device, wherein the battery-related information comprises the predicted available usage information.

12. The method of claim 11, wherein the predicted available usage information comprises a predicted number of remaining activation events available in the current battery charge cycle.

13. The method of claim 11, wherein the predetermined criterion comprises an activation activity threshold, whereby a battery event notification is issued if the predicted available usage information falls below the activation activity threshold.

14. The method of claim 13, wherein the activation activity threshold comprises a minimum remaining activation events limit, whereby a battery event notification is issued if the predicted available usage information indicates that a predicted number of remaining activation events falls below the minimum remaining activation events limit.

15. The method of claim 13, wherein the activation activity threshold is adjustable.

16. The method of claim 1, further comprising the step of transmitting, via the wireless communication channel between the smoking substitute device and the portable communication terminal, device information relating to a configuration of the smoking substitute device.

17. The method of claim 16, further comprising the step of determining, by the portable communication terminal based on the device information received from the smoking substitute device, a battery profile indicative of expected battery behaviour, wherein the battery-related information is calculated with reference to the battery profile.

18. The method of claim 1, further comprising the step of comparing, by the portable communication terminal, the battery-related information to threshold data to determine whether or not the battery-related information satisfies the predetermined criterion.

19. The method of claim 1, wherein issuing the battery event notification comprises generating a visible, audible or tactile output on the portable communication device.

20. A smoking substitute device comprising:
    a battery;
    a control unit;
    a memory storing computer readable instructions for execution by the control unit;
    a heater arranged to draw power from the battery during an activation event; and
    a wireless interface configured to:
        establish a wireless communication channel with a portable communication terminal,
        transmit a battery data log over the wireless communication channel, and
        renew the battery data log after transmission to the portable communication terminal, such that the battery data log from a certain time period is only transmitted once to the portable communication terminal.

\* \* \* \* \*